(12) United States Patent
Blank et al.

(10) Patent No.: US 7,811,719 B2
(45) Date of Patent: Oct. 12, 2010

(54) PEM FUEL CELL WITH CHARGING CHAMBER

(75) Inventors: Felix Blank, Constance (DE); Thomas Kunick, Illerkirchberg (DE)

(73) Assignee: Daimler AG, Stuttgart (DE)

( * ) Notice: Subject to any disclaimer, the term of this patent is extended or adjusted under 35 U.S.C. 154(b) by 102 days.

(21) Appl. No.: 11/996,861

(22) PCT Filed: Jul. 26, 2006

(86) PCT No.: PCT/EP2006/007376

§ 371 (c)(1),
(2), (4) Date: Apr. 11, 2008

(87) PCT Pub. No.: WO2007/017115

PCT Pub. Date: Feb. 15, 2007

(65) Prior Publication Data

US 2008/0220311 A1    Sep. 11, 2008

(30) Foreign Application Priority Data

Jul. 27, 2005   (DE) .................. 10 2005 035 098

(51) Int. Cl.
*H01M 8/02* (2006.01)
(52) U.S. Cl. ...................................... 429/514
(58) Field of Classification Search .............. 429/34–39
See application file for complete search history.

(56) References Cited

U.S. PATENT DOCUMENTS 5,683,828 A * 11/1997 Spear et al. .................. 429/13

7,335,437 B2    2/2008 Blank et al.

FOREIGN PATENT DOCUMENTS

| DE | 10055253   A1 |   | 5/2002 |
| DE | 10346594   A1 |   | 5/2005 |
| DE | 102004058117 | * | 6/2006 |
| DE | 102004058117 A1 |   | 6/2006 |
| WO | 03001621   A2 |   | 1/2003 |

\* cited by examiner

*Primary Examiner*—Jennifer K Michener
*Assistant Examiner*—Carlos Barcena
(74) *Attorney, Agent, or Firm*—Patent Central LLC; Stephan A. Pendorf (57) ABSTRACT

Proposed is a PEM fuel cell that comprises a separator plate assembly with a charging chamber, which is partitioned off by a partition wall and via charging spots has a fluid connection to an adjoining cathode chamber. The partition wall is designed so that the depths of the charging channels in the charging chamber and the depths of the distribution channels in the adjoining cathode chambers change in such a way that the quantity of oxidant that is charged at a charging spot from the charging chamber into the cathode chamber can be fixed in advance. As a result, the charging of oxidant, which has not been humidified or only slightly, into the cathode chamber can be improved with regard to the curve of the relative humidity along the cathode. Also proposed is a method for manufacturing a separator plate assembly suitable for a PEM fuel cell.

14 Claims, 8 Drawing Sheets

PEM FUEL CELL WITH CHARGING CHAMBER

The invention relates to a PEM fuel cell with charging chamber in accordance with the preamble of claim 1, and to a method for manufacturing a separator plate assembly to be used in such a PEM fuel cell in accordance with the preamble of claim 12. The subject matters according to the invention may find industrial application in the field of generating electric current for traction and/or the on-board power supply system of vehicles.

The fundamental design of a polymer electrolyte membrane fuel cell (in short: PEMFC; FC for Fuel Cell) adheres to the following principle: The PEMFC comprises one membrane-electrode assembly (MEA) that is composed of one anode, one cathode, and a polymer electrolyte membrane (PEM) disposed in between. In turn, the MEA is arranged between two separator plate units, whereby a separator plate unit arranged over the anode is equipped with fuel-distribution channels while a separator plate unit arranged over the cathode contains channels for the distribution of oxidant, and whereby these channels face the MEA. Channels of this type will be referred to as "distribution channels" hereinafter. The distribution channels form the anode chamber and cathode chamber, respectively. The electrodes, anode and cathode, are usually realized as gas diffusion electrodes (GDE). These electrodes serve the function of conducting away the electric current generated in the electrochemical reaction (e.g. $2H_2 + O_2 \rightarrow 2H_2O$) (hereinafter: fuel cell reaction) and to allow the reactants, educts and products, to diffuse through. A GDE usually comprises at least one gas distribution layer, at least one gas diffusion layer (GDL), and one catalyst layer, which faces the PEM and is where the electrochemical reaction takes place.

A fuel cell of this type is able to generate a high output of electric current at comparatively low operating temperatures. Real fuel cells are usually stacked to form so-called fuel cell stacks (hereinafter: stacks) in order to achieve a high power output, whereby instead of monopolar separator plates one employs bipolar separator plates (bipolar plates) so that monopolar separator plates only serve as stack end plates. The separator plates may consist of two or more partial plates that form an assembly and are therefore referred to as "separator plate assemblies". The term "separator plate assembly" hereinafter is to denote all of the above-mentioned plates and plate assemblies. Accordingly, a separator plate assembly may comprise a single plate or may be assembled from one or more partial plates.

As reactants one employs one fuel and one oxidant. In most cases one uses gaseous reactants (reaction gases), e.g. $H_2$ or a $H_2$-containing gas (e.g. reformate gas) as fuel and $O_2$ or an $O_2$-containing gas (e.g. air) as oxidant. The term reactants is to be understood as referring to all of the substances participating in the electrochemical reaction, i.e. also the reaction products, such as $H_2O$.

Some current PEMs require a certain water content in order to achieve adequate ion conductivity. This is particularly true of PEMs that consist of materials based on fluorinated sulphuric acids, such as Nafion. For this reason, PEMs of this type are usually humidified by humidifying the reactants before these are supplied to a PEMFC. The disadvantage of humidification is the associated complexity and the additionally necessary equipment (e.g. humidifier), which represents an obstacle in the striving for a very simple operating process and a very compact design for a fuel cell system.

A further disadvantage of humidification is that the level of humidification is difficult to adjust (humidification problem). For example, if one humidifies not enough or not at all and trusts that the water produced in the fuel cell reaction (product water) is sufficient to adequately humidify the PEM, then one faces the problem—especially on the cathode side—that in the vicinity of the intake port for oxidant (preferably air) there exists a tendency for water to evaporate while at the same time the oxidant at this location is comparatively dry, so that the PEM in this region is particularly prone to dry out. Drying out not only results in the loss of ion conductivity, but can also cause mechanical damage to the PEM, e.g. due to cracks.

While flowing through the channels of the separator plate assembly, the oxidant then absorbs product water from the MEA, which increases its relative humidity and progressively reduces the humidification problem, until this problem finally vanishes or under unfavourable conditions even reverses into the opposite problem, a water removal problem.

The gist of the water removal problem is that the oxidant—on its way from the intake port to the exit port—grows progressively more humid due to absorbing product water and consequently can absorb and thus remove less and less product water, so that at the exit port or in its vicinity one may even face the situation that product water can not be adequately removed. Now the product water condenses under unfavourable conditions and can block important paths for the supply and removal of reactants to and from the reaction centres, which adversely affects the fuel cell reaction and reduces the output of the fuel cell.

The water removal problem occurs especially if the oxidant is humidified before entering a fuel cell. As a result of the humidification, the MEA in the region of the intake port is moist enough to prevent drying out of the PEM, however in this case the oxidant right from the start can absorb less product water, so that the moisture level of the oxidant will quickly be too high to adequately absorb and remove product water. This can easily impair the fuel cell reaction.

For this reason, in the case of conventional fuel cells with humidification-dependent PEMs, one usually has to find a compromise between adequate humidification at the cathode inlet and adequate water removal at the cathode outlet.

As a solution to the humidification problem, the German Patent application DE 103 46 594 A1 of this applicant describes a fuel cell that comprises two fluid chambers (one cathode chamber and one anode chamber), whereby a further fluid chamber is partitioned off in one of the fluid chambers. For simplicity and in view of the humidification problem to be dealt with, we will in the following only deal with the case where the additional chamber is partitioned off the cathode chamber. But it is naturally also possible that one or even several chambers are partitioned off both the cathode chamber and the anode chamber, if a technical reason exists to do so. In the following, this separated additional chamber will be referred to as "charging chamber" in accordance with its intended function. The dividing wall may be a metal sheet, which is realized similar to a partial separator plate and is arranged on the cathode side of the separator plate assembly. The metal sheet will possess permeable spots, e.g. bore holes, which create a fluid connection from the charging chamber to the cathode chamber, so that a fluid (the oxidant) flowing in the charging chamber can reach the cathode chamber through the permeable spots and in this manner can be injected or charged (hereinafter: charging) into the cathode chamber. In the following, these spots will be referred to by the fitting term "charging spots". The charging chamber may extend over only a portion of the cathode chamber, preferably only over one third. With the help of the charging chamber it becomes possible to spatially distribute and thus break up the supply of oxidant to the cathode chamber over a larger region. As a result, not the entire volume of oxidant required for the fuel cell reaction will flow over the especially drying-sensitive part of the PEM in the region of the cathode inlet (intake region), but in a best case only a volume that can be electrochemically converted in this region. Since only a small amount of oxidant is charged in at the beginning, only little water is used for humidification of the PEM, in the optimum case less than is generated in this region as a result of the fuel cell reaction. Further downstream, before a further charging spot, the oxidant already will be partially humidified as a result of the water created in the fuel cell reaction, so that the charging of dry oxidant is even less detrimental than at the preceding injection. This trend continues for the following charging spots, so that in sum total the fuel cell can use oxidant that has been humidified only to a small degree or not at all, without any detrimental effect from drying-out on the PEM or its function. Thus, in a best-case scenario it becomes possible to eliminate the humidification and water recovery systems that up to now are needed for PEM fuel cell systems, which represents a significant simplification of such PEM fuel cell systems.

Even though DE 103 4 6 594 A1 with this approach provides the principle of a solution to the humidification problem, there exists further need for improvement, e.g. to effect an exact charging of the proper amount of oxidant at the proper locations, without the need of having to employ a complex control unit for this purpose.

Thus, one problem definition of the present invention is to further develop a PEM fuel cell of the above-mentioned type so that the charging of oxidant, which has been humidified not at all or only to a small degree, into the cathode chamber can be further improved in a simple manner with regard to the relative humidity curve along the cathode.

A further problem definition of the present invention is to specify a method for manufacturing a component part for a PEM fuel cell, whereby with the help of this part the charging of oxidant, which has been humidified not at all or only to a small degree, into the cathode chamber can be improved in a simple manner with regard to the curve of the relative humidity along the cathode.

These problems are solved by the subject matters defined in the claims. Preferred embodiments are defined in the dependent claims.

Accordingly, a first subject matter of the present invention is a PEM fuel cell, with one membrane-electrode assembly (MEA), one cathode chamber, which borders on the cathode of the MEA and on its side facing the cathode is partly bordered by a separator plate assembly and partly by a partition wall, which is arranged on the cathode side of the separator plate assembly and joined to the assembly by for example welding, whereby the partition wall separates at least one additional chamber (charging chamber) from the cathode chamber (i.e. the charging chamber is bordered by the partition wall on the cathode side and by the separator plate assembly on the opposite side), and whereby the at least one charging chamber possesses in at least one position (charging spot) a fluid connection to the adjoining cathode chamber, so that oxidant can be charged from the charging chamber through the charging spots into the adjoining cathode chamber.

The partition wall of the invention is designed so that the depths of the charging channels in the charging chamber and the distribution channels in the adjoining cathode chamber change in such a manner that the quantity of oxidant that is charged at a charging spot from the charging chamber into the cathode chamber can be fixed in advance.

If the partition wall does not cover the entire channel system on the cathode side, then the partition wall forms part of the distribution channels, whereas the separator plate assembly forms the charging channels in the region of the partition wall and forms the remaining part of the distribution channels outside of the region of the partition wall.

If the partition wall covers the entire channel system on the cathode side, then the partition wall forms the distribution channels, while the separator plate assembly forms the charging channels.

The term "fixed in advance" in the context of the present invention is to be understood as to mean that the depth of the channels of the separator plate assemblies are dimensioned or specified in advance in such a manner so that when flows pass through the cathode chamber and charging chamber during operation of the fuel cell, specific pressures will prevail at specific charging spots, which cause specific quantities of gas to flow from the charging chamber through the charging spots into the cathode chamber.

Due to the varying depths of the distribution channels and the charging channels, the fuel cell according to the invention is designed so that charging of oxidant—not humidified or humidified only slightly—from the charging chamber into the cathode chamber takes place selectively so that an improved curve of the relative humidity along the cathode is achieved in a simple manner. The improved curve is illustrated by the fact that along the region in which the charging takes place (charging region) an adequate humidification of the PEM is given at all positions and moreover that no liquid water is formed there, which could adversely affect the fuel cell reaction.

It is practical for the depths of the distribution channels to be complementary to the depths of the charging channels. This means that at positions where the oxidant distribution channels possess a narrow depth, the adjoining charging channels will possess a correspondingly greater depth, and vice versa. That is how the pressures of the fluids (oxidant) flowing in the two chambers can be selectively influenced so that pressure equalization will take place through the charging spots and predetermined quantities of oxidant will selectively and in a dosed manner flow into the cathode chamber.

The depth of the distribution channels preferably increases along the flow direction from the charging region towards the cathode outlet, and complementarily the depth of the charging channels decreases along the flow direction from the oxidant port to the end of the charging region. I.e. in this embodiment the charging channels become shallower along the flow direction of the oxidant, whereas the distribution channels start shallow, become deeper along the flow direction, and outside of the charging region continue at a constant depth to the cathode outlet, for example. It should be noted in this connection that the charging region might extend over the entire length of the channels formed in the separator plate assembly, so that the end of the charging region will be located in the region of the cathode outlet. This can create pressure conditions in the charging chamber and the adjoining cathode chamber that ensure a flow behaviour of the oxidant from the charging chamber into the cathode chamber that is advantageous with regard to the curve of the relative humidity in this region (charging region).

In a further development of the fuel cell according to the invention, the partition wall covers at least part of the length of the channels formed on the cathode side of the separator plate assembly and thus isolates them from the cathode chamber, thus forming the charging chamber in the region of the cover (cover region). In this connection it should be noted that the channels that are formed on the separator plate assembly and that are positioned in the cover region are charging channels, whereas any continuation of channels outside of the cover region will be part of the distribution channels.

It is preferable that the partition wall be arranged in the region of the oxidant port of the separator plate assembly. This simplifies the creation of a fluid connection between the oxidant port and the charging chamber and also simplifies the sealing of this connection against the surroundings. Furthermore, a channel structure existing in the port region can be used as oxidant feed into the charging region.

Further it is preferred that the partition wall extend from the oxidant port to at most the end of the first third of the length of the channels formed on the cathode side of the separator plate assembly, even more preferred to at most the end of the second third of the channels formed on the cathode side of the separator plate assembly, and especially preferred to at most the end of the third third of the channels formed on the cathode side of the separator plate assembly. Even though the mechanical complexity increases as the extent of the partition wall increases, the complexity required for the humidification of the oxidant decreases as the extent of the partition wall increases. For example, the required dimensions of a humidification device will be smaller or it even becomes possible to eliminate the humidification device, in particular if the partition wall extends over the entire length of the channels formed on the cathode side of the separator plate assembly.

In a further development of the fuel cell according to the invention, in the region of the cover, the channels formed on the cathode side of the separator plate assembly are separated by the partition wall from the oxidant port in such a manner, that a fluid connection to the oxidant port essentially only exists via the charging spots and the charging chamber. Thus, the charging chamber completely replaces the cathode intake region of conventional fuel cells. This allows a more precise control or setting of the charging of oxidant into the cathode chamber.

In another further development of the fuel cell according to the invention, the height of the ridges between the channels of the partition wall and the height of the ridges between the channels of the adjoining separator plate assembly are complementary to each other, so that the overall height of the separator plate assembly in the cover region corresponds to the overall height of the separator plate assembly outside of the cover region. This simplifies the stacking and clamping of the invention's fuel cell into a stack and ensures that the clamping forces are introduced into the stack in a way that does not deform the fluid chambers, which could have a negative impact on reactant flow, charging, and the curve of the relative humidity.

In this, it is preferred for the height of the ridges of the channels formed on the cathode side of the separator plate assembly to be lower in the region covered by the partition wall by the thickness of the material of the partition wall. Thus, the separator plate assembly assembled from the partition wall and the partial plates possesses—ignoring the depth of its channels for now—a uniform thickness along its surface. This also contributes to good stacking and clamping characteristics of the fuel cell according to the invention.

In one embodiment of the invention's fuel cell the partition wall is made up of a metal plate, preferably a metal sheet, into which preferably a channel structure is stamped, which forms the distribution channels in the region of the partition wall. Metal plates, in particular metal sheets, offer the advantage of excellent and precise machinability, particularly by embossing, so that the channels, in particular the depth of the channels and the height of the ridges in between, can be incorporated very precisely.

In this, it is preferred if the embossed metal sheet possesses bore holes that are intended as charging spots, whereby the bore holes preferably are arranged at the bottom of the distribution channels. It is practical for the diameters of the bore holes to be dimensioned so that the pressure loss of flowing through the bore holes is significantly higher than the pressure loss of flowing along the charging channel. In the present case, bore holes with a diameter of 0.3 mm, for example, were found to be suitable. The diameters of all bore holes should be essentially equal. As a result, the gas volume flowing through a bore hole per time unit is approximately equal for all bore holes, and the charged oxidant volume can be set in a simple manner via the number of bore holes. Bore holes of this type can be realized very simply and precisely, which contributes to the improved precision of the charging.

A further subject matter of the present invention is a method for manufacturing a separator plate assembly to be used in a fuel cell as described above, whereby the separator plate assembly comprises one partial plate on the anode side, one partial plate on the cathode side, and one partition wall arranged on the cathode-side partial plate. According to this invention, one at first joins the partition wall with the cathode-side partial plate, whereupon one attaches the anodeside partial plate to the cathode-side partial plate.

This prevents the occurrence of joining problems, which can be caused by the third partial plate of the separator plate assembly, the partition wall. If one at first joins the anode-side and the cathode-side partial plates and only afterwards connects the partition wall to the cathode-side partial plate, one faces the risk that the anode-side partial plate and/or the cooling channels located between the anode-side and cathode-side partial plates will be damaged during the joining process because joining connections for the partition wall must be positioned in the region of the already joined partial plates. This risk does not exist in the method according to the invention, since the joining connections for the anode-side partial plate can be put outside of the region of the already joined partition wall and cathode-side partial plate.

The invention's method can be used to manufacture a component part, namely a separator plate assembly for a PEM fuel cell, which can help to improve in a simple manner the charging of oxidant, which has not been humidified or only slightly, into the cathode chamber with regard to the curve of the relative humidity along the cathode.

In this, it is preferable to join the partial plates and the partition wall by welding, since welding allows in an uncomplicated manner the creation of even joining connections with very complex geometry (complex weld paths), in particular for metal plates.

In one variant of the invention's method, the welding spots are placed through charging spots. Additional welding points outside of the weld seams joining the anode-side and cathode-side partial plates can improve the electrical connection between the two partial plates. However, in the case at hand part of the cathode-side partial plate is covered by the partition wall and thus no longer accessible for placing a weld point to improve the electrical contact between the anode-side and cathode-side partial plate. An exception to this are the charging spots in the partition wall, e.g. the bore holes. The cathode-side partial plate that is covered by the partition wall is still accessible through these charging spots, so that for example a laser can be used to place a weld point there to improve the electrical contact between the partial plates.

The invention will be explained in more detail in the following. For this purpose, concrete embodiment examples of the invention are illustrated in a simplified manner in the figures and are explained in more detail in the following description.

Only the features that are essential for understanding the invention are labelled in detail in the figures.

Figure 1:
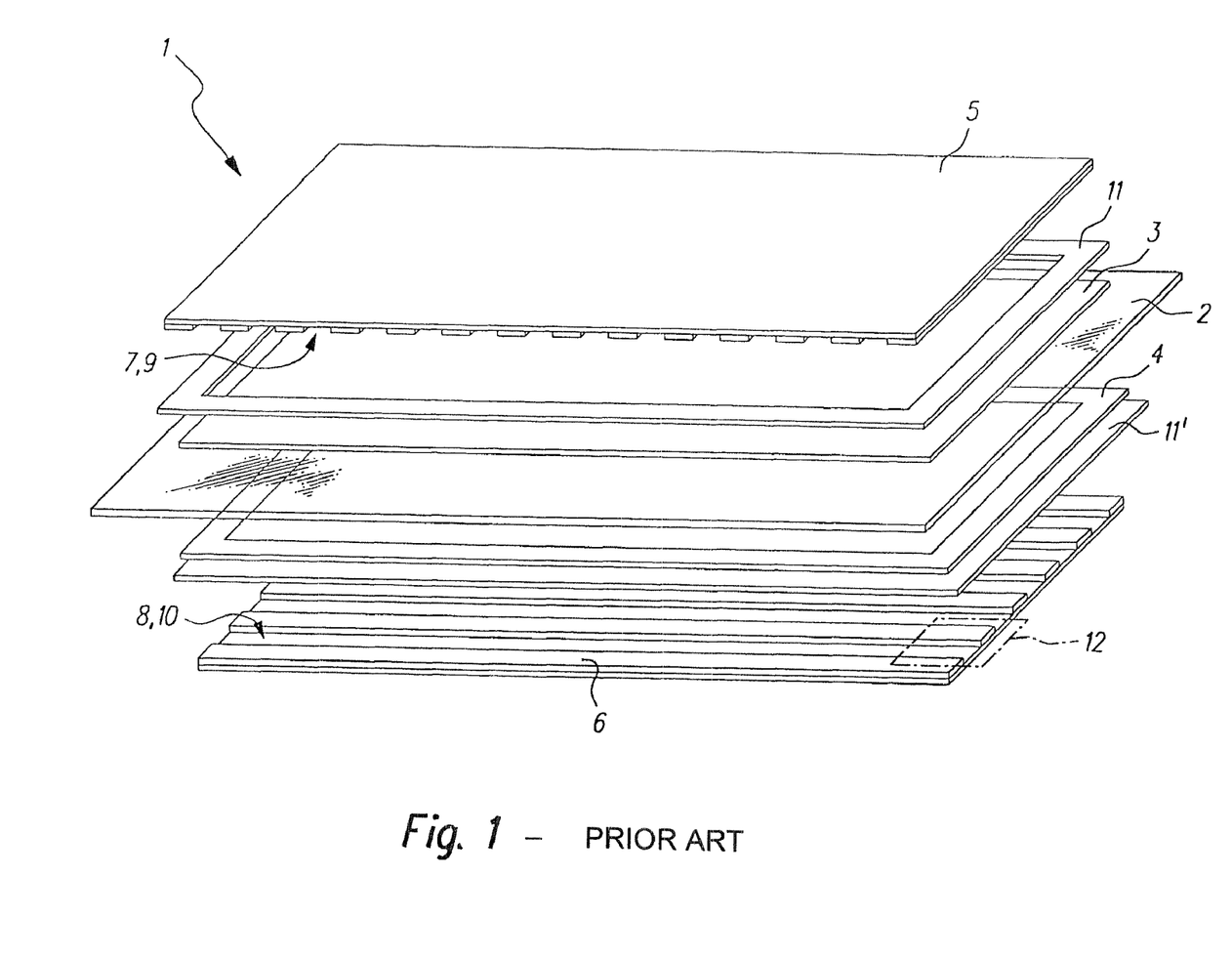
FIG. 1 shows a schematic exploded view of a state of the art fuel cell.

FIG. 1 shows an exploded view of the components of a conventional PEM fuel cell (1) that are essential within the framework of the present invention: The fuel cell (1) comprises one PEM (2), that is disposed between one anode (3) and one cathode (4) and joined together with these forms a MEA. The present fuel cell (1) is part of a stack (not illustrated), so that on the anode side and on the cathode side the MEA is bordered by bipolar separator plate assemblies (bipolar plates), for each of which only one of two partial plates (5, 6) is shown, namely the anode-side partial plate (5) and the cathode-side partial plate (6), respectively. If the fuel cell (1) is an individual cell that is not part of a stack, then (5) and (6) will be end plates. If the fuel cell (1) is an individual cell at the end of a stack, then (5) or (6) will be an end plate. The partial plates' (5, 6) surfaces that face an electrode possess a structured pattern, namely a channel system (7, 8), whereby in the assembled fuel cell the anode-side channel system (7) forms the anode chamber (9) and the cathode-side channel system (8) forms the cathode chamber (10). The electrode chambers (9, 10) are sealed fluid-tight against undesired leaks by sealing rings (11). The partial plates (5, 6) are joined in a stack to form a separator plate assembly. In the present example, the partial plates (5, 6) possess a structured pattern/channel system (7, 8) only on the respective surface that faces the electrode. But they can also be equipped with a channel system on the opposite surfaces, so that after assembly a further channel system is formed between them, which can be used to conduct a coolant for cooling purposes. The label (12) identifies a detail that is shown on a larger scale in FIG. 2.

Such a fuel cell (1) comprises further components, but these are known to a person skilled in the art and are not illustrated here for brevity. For example, these include outlet and intake ports for the reactants and the coolant, if applicable, further sealing elements, inlays for the feeding of reactants from the ports to the channel systems, and so forth.

Figure 2:
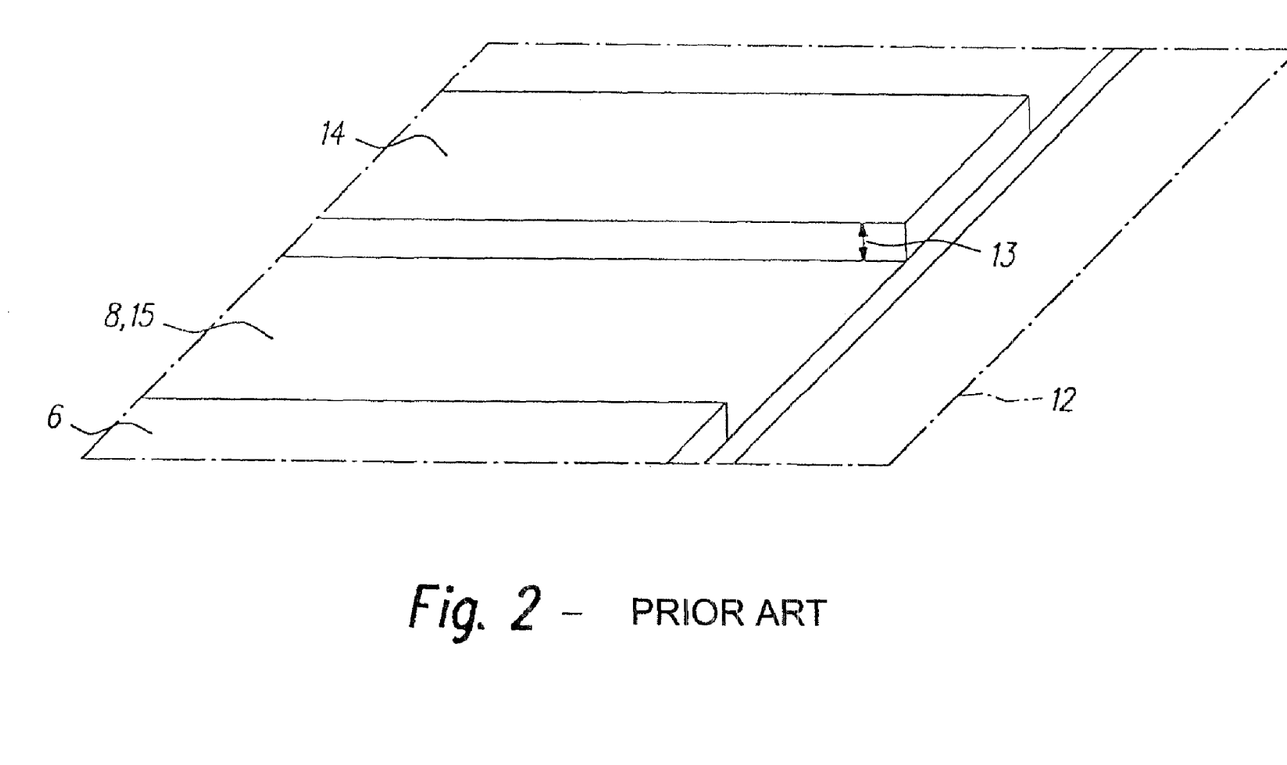
FIG. 2 shows a detail of FIG. 1.

FIG. 2 shows the detail (12) of FIG. 1 on a larger scale. Shown is the intake region of a distribution channel (15) of the channel system (8) of the separator partial plate (6), as well as the depth (13) of the distribution channel (15), whereby the depth (13) in this conventional fuel cell is constant along the cathode-side surface of the separator partial plate (6). The label (14) denotes a ridge of the channel system (8).

Figure 3:
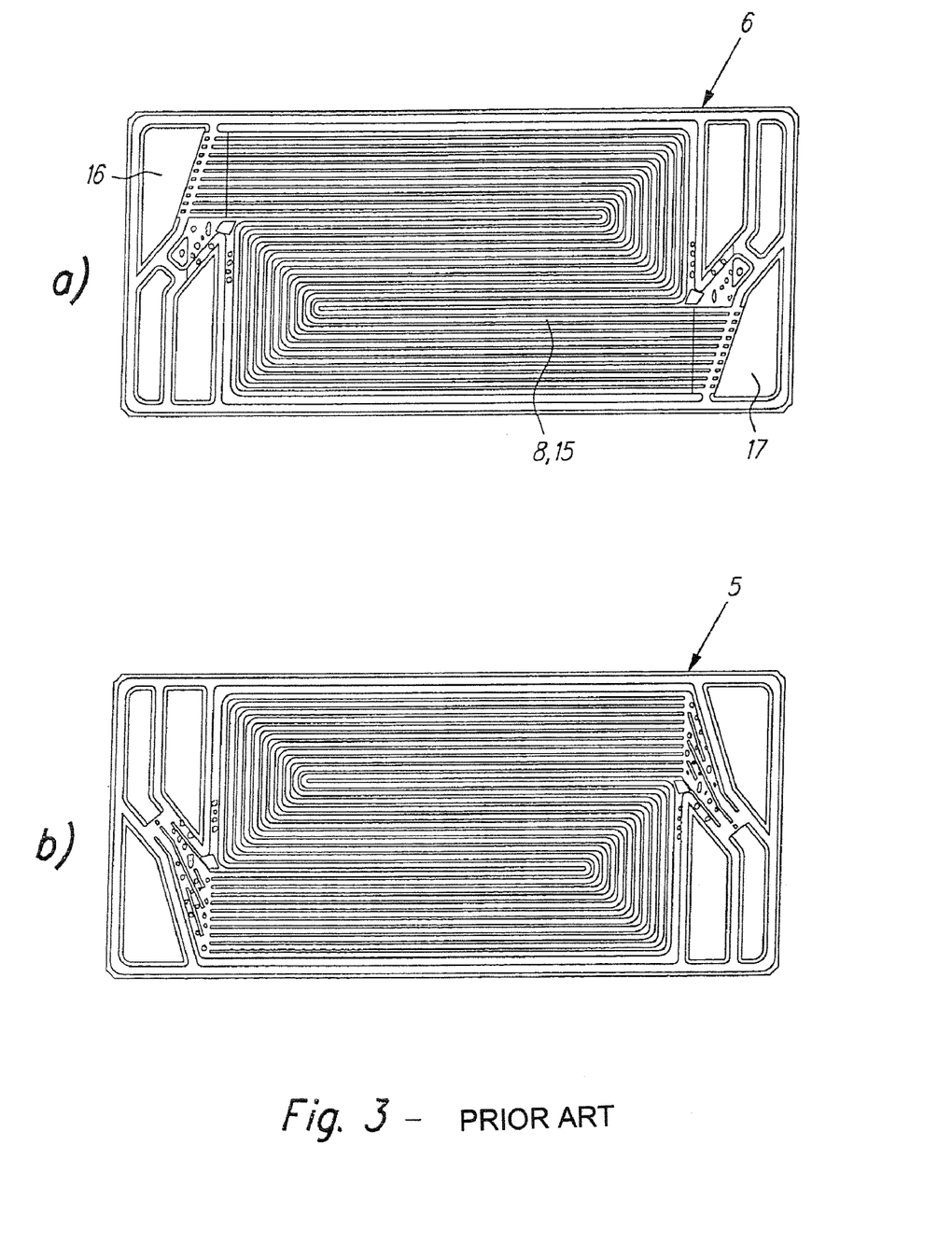
FIG. 3 shows a schematic representation of a conventional separator plate assembly: a) top view onto the cathode-side partial plate; b) top view onto the anode-side partial plate.

FIG. 3a) shows a cathode-side partial plate (6) of a separator plate assembly of a conventional fuel cell while FIG. 3b) shows an anode-side partial plate (5). We will only deal with the cathode-side partial plate (6) in the following. It comprises (among other features) one intake port (16) for an oxidant, one meandering channel system (8), and one outlet port (17) for the oxidant. The depth of the distribution channels (15) of the channel system (8) is constant along the entire length of the distribution channels (15).

Figure 4:
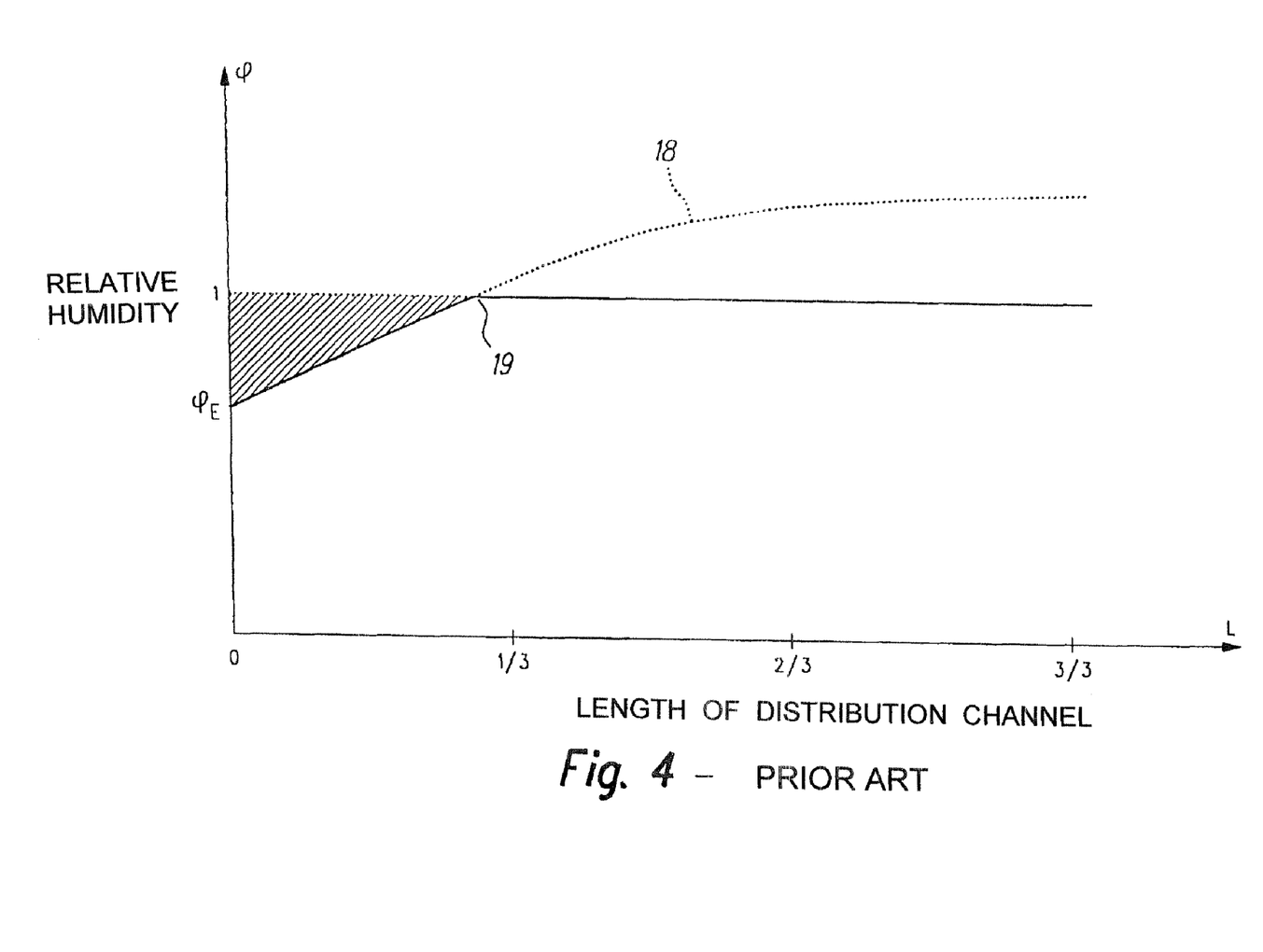
FIG. 4 shows the curve of the relative humidity in a channel system of a state of the art fuel cell with a partial plate according to FIG. 3a)

FIG. 4 schematically illustrates the curve of the relative humidity f (18) in a channel system (8) of a conventional fuel cell (1) as described above in FIGS. 1 to 3, whereby L represents the length of a distribution channel (15, compare FIG. 2). As oxidant in the present case one uses partially humidified air, which enters into the distribution channel at L=0 with a relative humidity $f_E$ of 53% (at approximately 75° C. and 1 bar gauge) (hereinafter: intake humidity). The relative humidity f of the air subsequently at first rises along the channel as a result of the fuel cell reaction, until the saturation point (19) is reached at f=1 and L~⅓. Up to the saturation point (19), the air is a single-phase system, whereas it becomes a two-phase system (gaseous air, liquid water) after the saturation point (19). Problems can arise in the cathode intake region between L=0 and L~⅓, since here the PEM has the tendency of drying out because of the low relative humidity f of the air. The objective of the present invention is to improve the curve of the relative humidity f in this region to such a degree so that the drying risk will be reduced or even eliminated.

Figure 5:
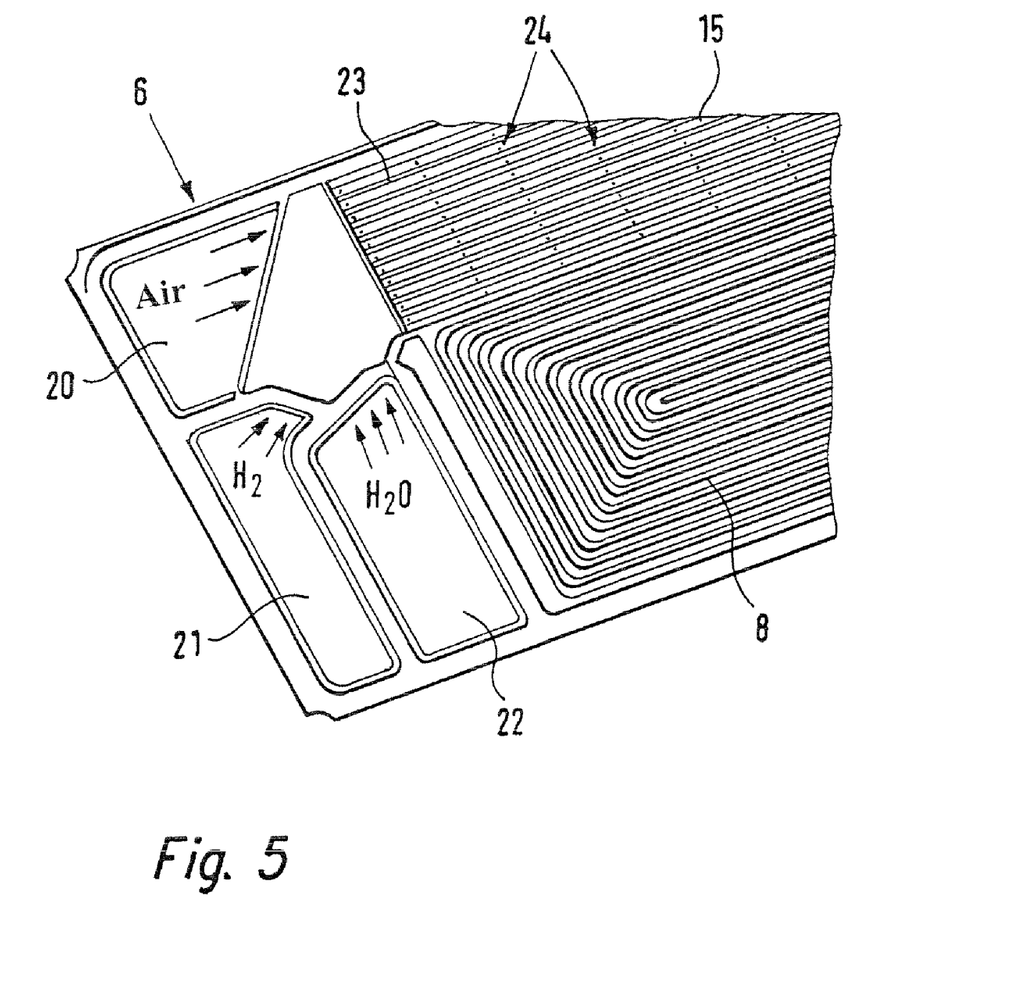
FIG. 5 shows a separator plate assembly with partition wall for a fuel cell according to the invention.

FIG. 5 shows part of a separator plate assembly of a fuel cell according to the invention, with an oxidant port (20), a fuel port (21), a coolant port (22), and a cathode-side channel system (8). Shown is a perspective top view onto a cathode-side partial plate (6) of the separator plate assembly. The separator plate assembly comprises a partition wall (23) that is realized as metal sheet and is welded onto the separator plate assembly. The partition wall (23) separates a charging chamber (compare FIG. 6) from the cathode chamber, i.e. it is arranged between the cathode and the separator plate assembly that faces the cathode. The partition wall (23) possesses a channel system that is formed so that the depths of the charging channels in the charging chamber and of the distribution channels in the adjoining cathode chambers change in such a way that the quantity of oxidant that is charged at a charging spot (24) from the charging chamber into the cathode chamber can be fixed in advance (compare FIG. 6). In the present example, the partition wall (23) is a metal sheet, into which a channel structure has been stamped, which forms the distribution channels in the region of the partition wall (23). The partition wall (23) is arranged in the region of the oxidant port (20) and covers approximately one third of the length of the cathode-side channel system (8). But it is preferable for the partition wall (23) to cover the entire length of the cathode-side channel system (8), i.e. the separator plate assembly's entire region that adjoins to the electrochemically active area of the adjoining MBA (not illustrated). The partition wall (23) is further equipped with bore holes that are arranged in the bottom of the distribution channels (15) and that are intended as charging spots (24) for air from the charging chamber into the cathode chamber. These bore holes possess a diameter of 0.3 mm. In the region where they are covered by the partition wall (23) (covered region), the channels (15) formed on the cathode-side of the separator plate assembly are separated from the oxidant port (20) in such a way that a fluid connection to the oxidant port (20) exists essentially only via the charging sports (24) and the charging chamber.

Figure 6:
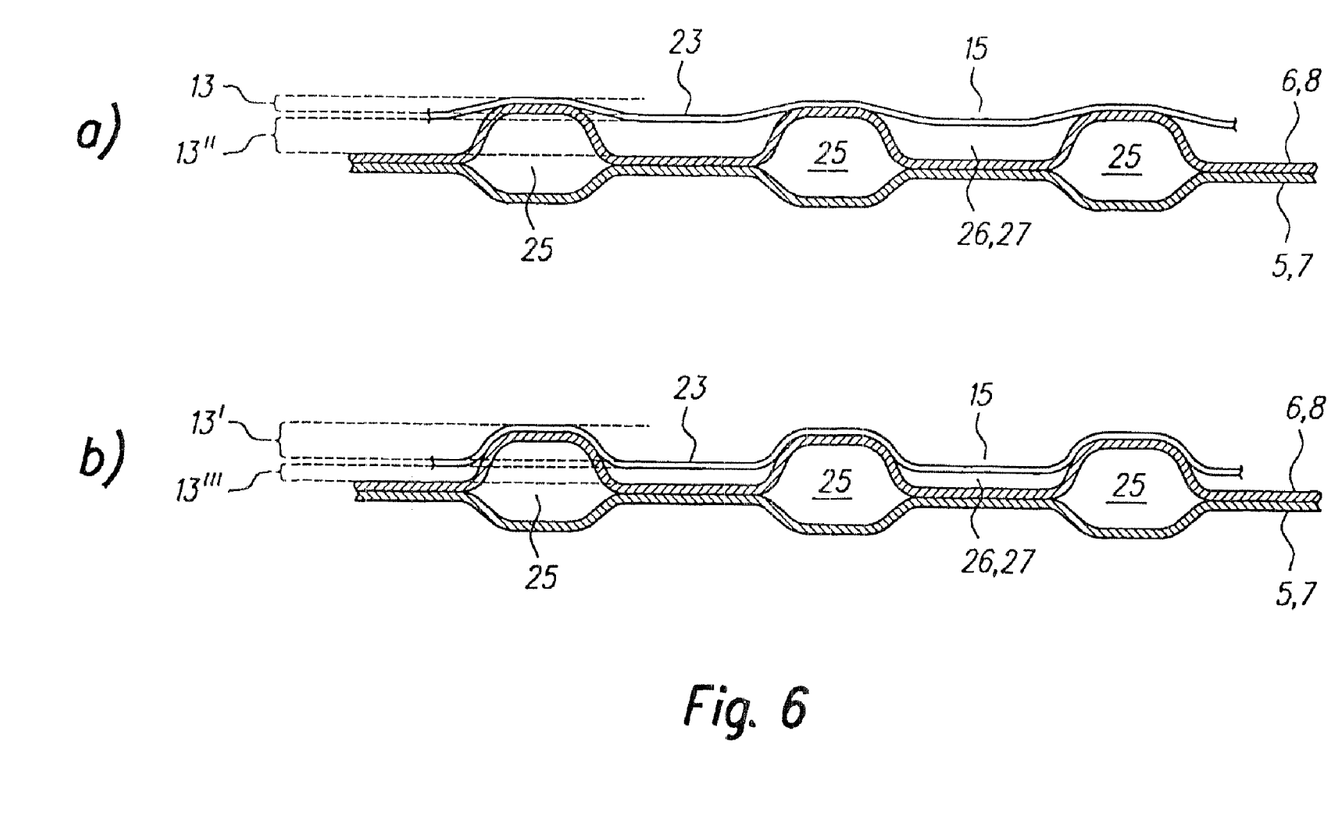
FIG. 6 shows two sections through a separator plate assembly with partition wall: a) in the region of the cathode inlet; b) in the region of the end of the charging chamber.

FIG. 6 shows a schematic representation of two sections through the separator plate assembly with partition wall (23) for a fuel cell according to the invention. FIG. 6a) shows a section through the cathode intake region while FIG. 6b)

shows a section through the end region of the charging chamber. If the partition wall (23) covers the entire length of the channels formed on the cathode side of the separator plate assembly, then the end of the charging chamber will be located in the region of the cathode outlet. It is also evident that the separator plate assembly comprises two partial plates in addition to the partition wall (23), in particular an anode-side partial plate (5) with an anode-side channel system (7) and a cathode-side partial plate (6) with a cathode-side channel system (8), whereby a cooling channel system (25) is formed between the two partial plates. In the cathode chamber, the partition wall forms distribution channels (15), while in the charging chamber (26) it delimits the charging channels (27) on the cathode side. The depths of the distribution channels (15) of the partition wall (23) are labelled (13) for the region of the section through the cathode intake region and (13') for the region of the section through the end region of the charging chamber. The depths (13, 13') increase from the cathode intake region towards the cathode outlet region/end region of the charging chamber, i.e. in the flow direction of the oxidant. Since the partition wall (23) is arranged on the separator plate assembly, as illustrated in FIG. 6, the depths (13", 13''') of the charging channels (27) decrease along the same direction and to the same degree, i.e. the depths (13, 13') of the distribution channels (15) are dimensioned complementary with respect to the depths (13', 13''') of the charging channels (27). A suitable dimensioning of the channel depths (13 to 13''') allows the creation of pressure conditions in the charging chamber and the adjoining cathode chamber that cause a pressure equalization to occur through the charging spots (not illustrated), which causes oxidant to be charged selectively from the charging chamber into the adjacent cathode chamber. In this way, the charging can be selectively set in advance with the help of the specially designed structure depth of the partition wall.

Figure 7:
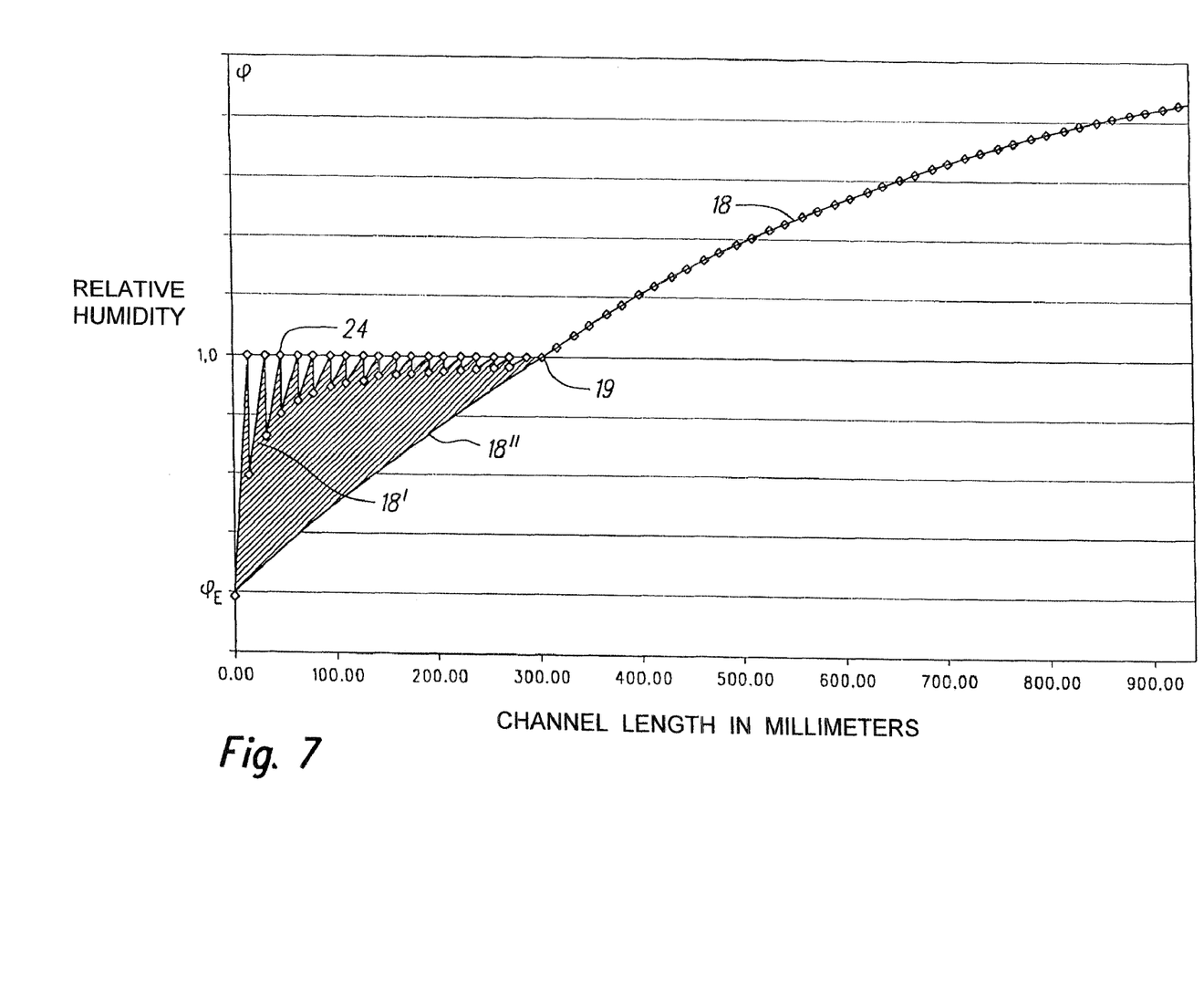
FIG. 7 shows the curve of the relative humidity along a cathode channel for a first embodiment of the invention.

FIG. 7 shows a curve of the relative humidity f (18, 18', 18") along a cathode channel for a first embodiment of the invention's fuel cell. The shown chart is structured analogously to the chart shown in FIG. 4, except that the channel length L here is given in millimeters instead of fractions of the total channel length. In the illustrated case, the charging region is designed so that saturation (f=1) is reached but not exceeded at the charging spots (24), of which only one is labelled (24) for a clearer presentation. Shown as a comparison below the saturation point (19) are two branches (18', 18") of the curve of the relative humidity f in this region: The upper branch (18') possesses a saw-tooth-like curve and at the saturation point (19) joins the curve (18), which is already known from FIG. 4. The curves (18') and (18) together form the curve of the relative humidity f (18, 18') in a fuel cell according to the invention. As a comparison, the lower branch (18") shows the curve of the relative humidity f in this region in a conventional fuel cell. The lower branch (18") also joins the curve (18) (already known from FIG. 4) at the saturation point (19). The curves (18") and (18) together form the curve of the relative humidity f (18, 18") in a conventional fuel cell.

The saw-tooth-like curve of the upper branch (18') of the relative humidity f (18, 18') in the invention's fuel cell can be explained as follows: The not-humidified oxidant (ambient air) enters the distribution channel at L=0 with an intake humidity $f_E$. However, according to the invention, not the entire volume of oxidant required for the fuel cell reaction enters here, but only a portion. The relative humidity f of the oxidant strongly increases along the flow direction due to the water produced in the fuel cell reaction. This rise is particularly strong in comparison to a conventional fuel cell because the quantity of charged oxidant is lower than in conventional fuel cells while the production of product water is approximately equal, so that the ratio of partial pressure of water vapour to partial pressure of oxidant is greater in the invention's fuel cell than in conventional fuel cells. The relative humidity f drops abruptly at the first (along the flow direction) charging spot (24) because the charged oxidant is comparatively dry, which shifts the ratio of partial pressure of water vapour to partial pressure of oxidant back in favour of the oxidant. Subsequently the relative humidity f again strongly rises along the flow direction until once again oxidant is mixed in, etc., until the end of the charging region is reached (approximately at the location where the saturation point (19) is reached). As a result, the relative humidity f in the region where the oxidant enters into the cathode chamber of an invention's fuel cell can be increased in comparison to a conventional fuel cell in such a way that the risk of a drying out of the PEM in this region is reduced or even eliminated. On the other hand, the intake/charging region (28) of the invention's fuel cell is designed so that the relative humidity f at no point exceeds saturation (f=1). This ensures that no liquid water is created in the charging region (28), which under unfavourable conditions could block the charging spots (24). Thus, in total the relative humidity f in the region where the oxidant enters into the cathode chamber of an invention's fuel cell can be increased in comparison to a conventional fuel cell, without any risk of droplet formation or blocking of charging spots (24).

Figure 8:
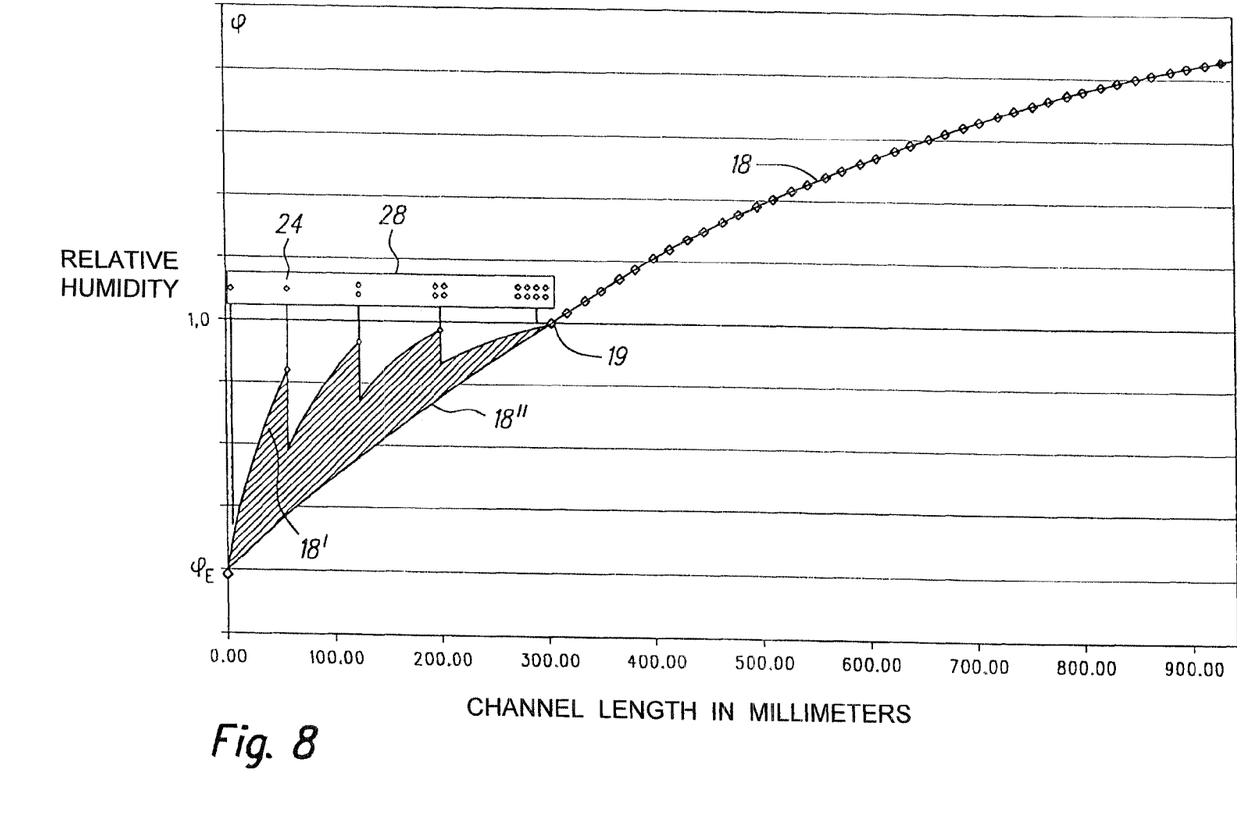
FIG. 8 shows the curve of the relative humidity along a cathode channel for a second embodiment of the invention.

FIG. 8 shows the curve of the relative humidity f (18, 18', 18") along a cathode channel for a second embodiment of the invention's fuel cell. The charging region of this fuel cell is in principle designed analogous to the one in FIG. 7, however the charging region (28) possesses additional five groups of charging spots (24) (again, for clarity's sake only one charging spot (24) is labelled in detail, representing all of the sixteen illustrated ones). One notices that the number of charging spots (24) per group increases along the flow direction of the oxidant (from left to right). This allows to further increase (in comparison to a conventional fuel cell) the relative humidity f in the region where the oxidant enters into the cathode chamber of a fuel cell according to the invention, whereby the risk of droplet formation and blocking of the charging spots (24) is low.

The curves of the relative humidity f shown here have been improved by the above-described charging concept. The improvement is achieved by raising the local relative humidity f at the MEA in the region of the partition wall and thereby achieving an improved conductivity of the MEA. This has a positive effect on the homogenization of the fuel cell reaction and consequently of the current density distribution, and as a result also on the lifetime of the MEA and its PEM, and thus the entire fuel cell.

The invention has been explained on the basis of the depths of the charging channels and of the adjacent distribution channels. However, on principle the invention can be applied analogously to geometric features of the channels other than the depth, such as for example their flow cross sections.

LIST OF REFERENCE NUMBERS

1 PEM fuel cell
2 PEM
3 Anode
4 Cathode
5 Anode-side partial plate
6 Cathode-side partial plate
7 Anode-side channel system
8 Cathode-side channel system 9 Anode chamber
10 Cathode chamber
11, 11' Sealing ring
13 Detail
13, 13' Channel depth
14 Ridge
15 Distribution channel
16 Intake port for oxidant
17 Outlet port for oxidant
18 Curve of the relative humidity f (State of the art)
18' upper branch of the relative humidity curve below the saturation point (Invention)
18" lower branch of the relative humidity curve below the saturation point (State of the art)
19 Saturation point
20 Port for oxidant
21 Port for fuel
22 Port for coolant
23 Partition wall
24 Bore hole, charging spot
25 Cooling channel system
26 Charging chamber
27 Charging channel
28 Charging region
f relative humidity
$f_E$ Intake humidity
L Channel length

The invention claimed is:

1. A PEM fuel cell, with
a membrane-electrode assembly (MEA),
a cathode chamber, which borders on the cathode of the MEA and on its side facing the cathode is defined for one part by a separator plate assembly and for the other part by a partition wall, which partition wall is arranged on the cathode side of the separator plate assembly and is joined to the separator plate assembly,
whereby the partition wall separates at least one charging chamber from the cathode chamber and whereby the at least one charging chamber possesses in at least one charging spot a fluid connection to the adjoining cathode chamber, so that oxidant can be charged from the charging chamber through the charging spots into the adjoining cathode chamber, and
wherein the depth of the distribution channels increases along the flow direction from the charging region to the cathode outlet, and, complementary to this, the depth of the charging channels decreases along the flow direction from the oxidant port to the end of the charging region, such that the quantity of oxidant that is charged at a charging spot from the charging chamber into the cathode chamber can be set in advance.

2. The PEM fuel cell of claim 1, wherein in the charging region charging spots are arranged in groups, and wherein the number of charging spots per group increases along the flow direction of the oxidant.

3. The PEM fuel cell of claim 1, wherein the partition wall covers and separates from the cathode chamber at least part of the length of the channels formed on the cathode side of the separator plate assembly, which is how the charging chamber is created in the region of the cover.

4. The PEM fuel cell of claim 3, wherein the channels formed on the cathode side of the separator plate assembly are in the cover region separated from the oxidant port in such a way that a fluid connection to the oxidant port exists essentially only via the charging spots and the charging chamber.

5. The PEM fuel cell of claim 3, wherein the heights of the ridges between the channels of the partition wall and the heights of the ridges between the channels of the adjoining separator plate assembly are formed complementary to each other in the cover region, so that the overall height of the separator plate assembly in the cover region is equal to the overall height of the separator plate assembly outside of the cover region.

6. The PEM fuel cell of claim 3, wherein the height of the ridges of the channels formed on the cathode side of the separator plate assembly is reduced in the region of the cover by the value of the thickness of the material of the partition wall.

7. The PEM fuel cell of claim 1, wherein the partition wall is arranged in the region of the oxidant port of the separator plate assembly.

8. The PEM fuel cell of claim 1, wherein the partition wall extends from the oxidant port to the end of the channels formed on the cathode side of the separator plate assembly.

9. The PEM fuel cell of claim 1, wherein the partition wall is made of a metal sheet, into which a channel structure is stamped, which forms the distribution channels in the region of the partition wall.

10. The PEM fuel cell of claim 9, wherein the stamped metal sheet possesses bore holes that are intended as charging spots, whereby the bore holes are arranged in the bottom of the distribution channels.

11. A method for manufacturing a separator plate assembly for application in a fuel cell of claim 1, whereby the separator plate assembly comprises one anode-side partial plate, one cathode-side partial plate, and one partition wall arranged on the cathode-side partial plate, wherein at first the partition wail is joined to the cathode-side partial plate and subsequently the anode-side partial plate is joined to the cathode-side partial plate, wherein the partial plates and the partition wall are joined by welding, and wherein welding points are placed through charging spots.

12. The PEM fuel cell of claim 1, wherein the partition wall covers and separates from the cathode chamber the entire length of the channels formed on the cathode side of the separator plate assembly, which is how the charging chamber is created in the region of the cover.

13. The PEM fuel cell of claim 1, wherein the partition wall extends from the oxidant port to at most the end of the first third of the length of the channels formed on the cathode side of the separator plate assembly.

14. The PEM fuel cell of claim 1, wherein the partition wall extends from the oxidant port to at most the end of the second third of the channels formed on the cathode side of the separator plate assembly.

* * * * *